United States Patent [19]

Schiel et al.

[11] 4,414,890
[45] Nov. 15, 1983

[54] PRESS ROLL WITH ADJUSTABLE FLEXION

[75] Inventors: Christian Schiel, Heidenheim; Robert Wolf, Herbrechtingen, both of Fed. Rep. of Germany

[73] Assignee: J. M. Voith GmbH, Fed. Rep. of Germany

[21] Appl. No.: 355,571

[22] PCT Filed: Jun. 26, 1981

[86] PCT No.: PCT/EP81/00085
§ 371 Date: Feb. 22, 1982
§ 102(e) Date: Feb. 22, 1982

[87] PCT Pub. No.: WO82/00165
PCT Pub. Date: Jan. 21, 1982

[30] Foreign Application Priority Data

Jun. 28, 1980 [DE] Fed. Rep. of Germany ....... 3024575
Dec. 24, 1980 [DE] Fed. Rep. of Germany ....... 3049080

[51] Int. Cl.³ .............................................. B30B 3/04
[52] U.S. Cl. .................................. 100/162 B; 29/115; 29/116 AD
[58] Field of Search .......... 100/162 B; 29/115, 116 R, 29/116 AD, 113 AD

[56] References Cited

U.S. PATENT DOCUMENTS 3,119,324 1/1964 Justus .
3,276,102 10/1966 Justus .
3,766,620 10/1973 Roerig .
3,889,334 6/1975 Justus et al. ......................... 29/115
3,949,455 4/1976 Biondetti .
3,997,953 12/1976 Christ et al. .................... 29/116 AD
4,213,232 7/1980 Biondetti .

FOREIGN PATENT DOCUMENTS 2503051 1/1976 Fed. Rep. of Germany .

Primary Examiner—Peter Feldman
Attorney, Agent, or Firm—Ostrolenk, Faber, Gerb & Soffen

[57] ABSTRACT

A press roll with adjustable flexion has a roll shell mounted to rotate around a fixed yoke and mounted with self-aligning bearings on a support cap in which the yoke is also supported on its own curved support. The press roll works in conjunction with a mating roll to form a press zone, near which there is a main hydraulic support that is positioned between the yoke and the shell and that transfers support forces from the yoke to the shell. The distance between the bearings of the shell is equal to that of the mating roll. The self-aligning bearing and the curved yoke support are mounted concentrically on a tubular collar of the support cap. There can also be supplemental supports outside the press zone for imposing additional flexion on the roll shell.

20 Claims, 4 Drawing Figures

PRESS ROLL WITH ADJUSTABLE FLEXION

BACKGROUND OF THE INVENTION

Technical Field

The invention concerns a press roll with adjustable flexion, preferably intended for use in the paper industry. The press roll has a hollow shell that can rotate around a fixed yoke and, in conjunction with a mating roll, form a web, e.g. press nip for a web of paper, to travel through. The axis of rotation of both rolls lie in the same press plane as the press nip. The press roll has the following additional characteristics:

(a) A self-aligning bearing keeps each end of the shell at least indirectly away from the yoke.

(b) There is a hydraulic support in the shell near the press rip that transfers support forces from the yoke to the shell along the press plane.

(c) Each end of the yoke rests directly on support caps.

(d) The longitudinal distance between the center planes of the supported areas of the yoke (the planes being perpendicular to the axis of rotation of the rolls,) is no longer than and preferably just as long as the distance between the mating-roll bearings.

State of the art

Press rolls of the type just described and similar rolls are known from the publications 1. Das Papier, 1980, 5, pp. 165–71,
2. German Auslegeschrift 2 407 510 corresponding to U.S. Pat. No. 3,932,921,
3. U.S. Pat. No. 3,119,324,
4. German Offenlegungsschrift No. 2 503 051,
5. U.S. Pat. No. 3, 276,102,
6. German Auslegeschrift No. 2 418 431 corresponding to U.S. Pat. No. 3,949,455,
7. U.S. Pat. No. 3,766,620, and
8. German Auslegeschrift 2 826 316 corresponding to U.S. Pat. No. 4,213,232.

The shell of the press rolls known from Publications 1 and 2 is approximately as long as that of the mating roll and each end of the shell is mounted directly against the yoke with a self-aligning bearing. Thus the longitudinal distance between the center planes of the self-aligning bearings of the shell, said planes being perpendicular to the axis of rotation of the rolls, is shorter than the distance between the mating-roll bearings.

The press roll known from Publication 1 (especially FIG. 1, p. 169) is of the type called a floating roll. The hydraulic support is a semiannular pressurized compartment between the yoke and the shell extending essentially the total length of the shell. The roll known from Publication 2 on the other hand has a certain number of hydrostatic pressure shoes distributed along the press gap over the total length of the shell of the roll.

Rolls of this type are used to extract water in the wet sections of papermaking machines or to calender the dry paper, for example. The last function, especially, requires an especially precise nip between press roll and mating roll to maintain uniform paper thickness over the total width of the web. This is to ensure that the finished roll of paper will be as cylindrical as possible. If the two rolls do not mate precisely, the rolls of paper will be irregular in shape, making them hard to handle and leading to rejection.

When a web of paper is processed in a press of this type, the possibility of applying different pressures on the edges and on the middle of the web may also be desirable. This is done in an attempt to eliminate any irregularities in paper thickness produced in other sections of the paper machine, like variations in weight per unit areas or basis weight produced in the wet section, variations in the moisture of a felt, or variations in dryness over the width of the web upstream of a calender stack. One disadvantage of the known roll presses, which employ a press roll with adjustable flexion in conjunction with a solid mating roll, is that they frequently make it impossible to obtain the desired uniformly thick web. Deviations that vary with the level of pressure and that are apparently due to the distance between the mating-roll bearings being greater than the length of the press-roll shell always occur.

This disadvantage affects all known types, both the floating rolls known from FIG. 1, page 169 of Publication 1 and the rolls known from Publication 2.

Using a correction compartment and what are called ring elements, which have no internal pressure, to correct irregularities in web thickness is admittedly known from Publication 1. Still, since the design of the roll press remains unaltered in principle, it has been impossible up to now to eliminate the basic causes of such irregularities.

Another type of press roll is disclosed in Publications 3 and 4, in which the shell is provided with an extension at each end, with the shell bearings mounted on the extensions. The result is a greater distance between the bearings of the shell than in the designs in Publications 1 and 2. But the yoke is also accordingly longer. The distance between the center plane of the supported surfaces of the yoke is, in particular, greater than in the designs in Publications 1 and 2, and considerably greater at any rate than that between the mating-roll bearings. This has several drawbacks. First, it makes for bending moments in the machine frame that get transferred to the press rolls and mating rolls. What is especially serious is that the bending moment in the middle of the yoke is considerably higher than before, so that the diameter of the yoke must be increased if the same support forces as previously are to be transferred from the yoke to the shell. This makes the whole roll larger, heavier, and more expensive.

Another type of press roll with an extended shell is known from Publication 5 (FIG. 9). In this case the yoke does not rest immediately on the support caps but through the intervention of additional roller bearings on the inside of the shell. This necessitates a considerable enlargement of the shell bearings, which must now transfer the support forces of not only the shell but also of the yoke to the support caps and the machine frame.

SUMMARY OF THE INVENTION

The basic purpose of the invention is to provide a press roll with adjustable flexion in order to ensure a perfect mating (or fitting) in the nip when it is pressed against the mating roll without the distance between the supported surfaces of the yoke being significantly greater than that between the mating-roll bearings. It should also be possible if necessary to accommodate devices to apply an additional random flexion to the ends of the press-roll shell without increasing its overall dimensions. Finally it should be possible to employ the press roll in accordance with the invention with a simple type of drive mechanism.

The above-stated purpose is achieved in accordance with the invention by means of a press roll with the characteristics disclosed in claim 1. What is important here is that the support caps are provided with a collar extending into the shell of the roll and that the yoke is supported on these collars. The inventors have in fact recognized that such a design is decisive for making the distance between the self-aligning bearings on the roll shell and that between the bearings on the mating roll equal or at least approximately equal without necessitating an increase in the distance between the supported surfaces of the yoke and without abandoning the possibility of supporting the yoke directly on the support caps. In accordance with the invention therefore, the supported surfaces of the yoke and the self-aligning bearings of the shell are "encased" inside each other, although in a different way than that known from Publication 5 and without the drawbacks entailed by that design. In particular, self-aligning bearings with dimensions that remain within the ordinary range can be employed for the shell.

Since the shell is longer than that on the press rolls known from Publications 1 and 2, additional hydraulic supports can be provided at its ends. This will be discussed later in detail. The design in accordance with the invention is necessary to ensure simple and hence kinematically unobjectionable gearing of the shell. This will also be specified in detail later.

The greatest advantage of the invention is that the distance between the self-aligning bearings of the shell and that between the bearings of the mating roll can be approximately equal without necessitating an increase in the overall length of the press roll (especially at the yoke). This will ensure a perfect nip between the two rolls, i.e. a uniform mating of the two rolls over their total length.

Publication 6, which was cited in the introduction, discloses a press roll with a design that is basically different from that in the present invention. In that device the yoke is not supported in a support cap. Its ends are bell-shaped and are supported through intermediate roller bearings on the ends of the shell. Thus the yoke-support forces must be transferred through those parts and through the self-aligning bearings of the shell to a frame, to support caps, or to similar devices. But the self-aligning bearings will also have to bear the forces that support the shell. Thus, this known design has the same drawback as the press roll in Publication 5. It requires not only more roller bearings but also larger self-aligning bearings on the shell. Another drawback is that the forces that support the yoke and apply to the ends of the shell are especially destructive when a hydraulic support is employed to generate a specific elastic line in the shell. In other words, it is impossible to obtain a precise nip between the shell and the mating roll.

Since the yoke bends when the press roll is in operation, it is preferable for the supported surfaces of the yoke to be spherical, as is in itself known. Otherwise, the design will be carried out in general so that when there is no stress on the press roll the yoke will be coaxial with the shell. In this case, the spherical supported surfaces of the yoke and the self-aligning bearings of the shell of the press roll will share a midpoint at each end. In other words, the two mid-points will be equivalent. Deviations are, however, possible. The midpoint of the spherical supported surface can be displaced in relation to that of the self-aligning bearing on the shell, the displacement being radial toward the mating roll. This will permit greater yoke flexion with all other dimensions constant.

There is a considerable advantage to both cases. The support forces initiated at each end by the yoke and by the shell in the support caps will lie along the same line of action. If the center of the seating surface of the support cap on the machine frame is also positioned along this line, there will be no bending moment between the support cap and the machine frame.

Another embodiment of the invention is disclosed in claim 3. To paraphrase this claim, the distance between the two supported surfaces of the yoke is shorter than that between the self-aligning bearings of the shell. Admittedly, certain bending moments must be taken into account. There are, however, advantages from another point of view. First, the yoke flexion is decreased, always assuming constant yoke diameter and constant load. This decreased flexion allows a shorter inside width for the roll shell and hence a shorter outer diameter. On the other hand, the stress on the yoke will be lower for the same load. This means that lower-strength materials can be used for the yoke, or its diameter can be decreased, which again permits the diameter of the roll itself to be shorter.

In any case, these measures will decrease the manufacturing cost of the press roll.

Other advantageous embodiments of the press roll in accordance with the invention are disclosed in claims 4 through 6.

Another especially important and advanced concept associated with the invention concerns the gearing of the roll shell. The significant characteristics of this drive are disclosed in claims 7 and 8. To paraphrase claim 7, as viewed in a longitudinal section through the press roll there is an outer crown gear that is positioned so that its center plane, which is perpendicular to the axis of rotation of the roll, will coincide at least approximately with the center plane of the self-aligning bearing on the shell. A press-roll drive that differs in significant details from that in the invention is known from the Publication 7 cited in the introduction. The cited drive admittedly has a crown gear that engages with a drive pinion that can be adjusted in a pendulum motion. But the exterior crown gear in that case is axially displaced in relation to the self-aligning bearing on the shell. The result is that the gearing force in the shell generates a bending moment. The drive pinion is also mounted differently. It is mounted rigidly in a drive housing that is separate from the support cap. The drive housing itself is mounted with an additional roller bearing inside the roll shell. The housing will thus accompany, along with the pinion, any inclination of the shell when the latter bends. One drawback of this design is that, in addition to the support cap in which the yoke rests, it requires an extra housing and an additional bearing. The drive also necessitates a longer yoke, and the cap that supports the yoke must be placed farther out than with a roll that has no drive. This results in other drawbacks. In particular, the flexion of the yoke must increase if the dimensions of its cross-section and the load are to remain constant.

Another concept associated with the invention concerns means that permit the ends of the roll shell to deviate from the normal line of flection at random if necessary. Supplemental hydraulic supports are provided at the ends of the shell between its self-aligning bearings and the already existing hydraulic support (called "main support" in what follows) in accordance with claims 9 through 16. The self-aligning bearings play an important part here because they keep the ends of the shell immobile. Appropriate adjustment of pressure in the supplemental supports. The supplemental supports may be aligned to act in the direction of press or counter to the direction of press, will permit the following distortions in the line of flexion:

1. The supplemental supports are not activated. The shell bends along the normal line of flexion. The hydraulic pressure in the main support can still be varied to make the press in the nip exactly uniform, heavier in the middle, or heavier at the edges.
2. The supplemental supports act against the direction of press and the hydraulic pressure in the main support is slightly increased. The result is uniform press along a wide middle range and more press at the edges. If the hydraulic pressure in the main support is further increased, a smooth press profile at the edges and a peak pressure in the middle will be obtained.
3. The supplemental supports act in the direction of press and the hydraulic pressure in the main support is slightly reduced. The result is heavy pressing along a wide middle range and reduced pressing at the edges. If the pressure in the main support is reduced even more, a smooth press profile at the edges and reduced pressure in the middle will be obtained.

The supplemental supports at both ends of the roll can be adjusted differently if necessary. The main support can also be divided into several individually adjustable sections.

The invention permits the roll shell to bend farther than that of a conventional press roll with lower forces. Increasing the distance between the self-aligning bearings on the shell also considerably increases the distance between the self-aligning bearings and the supplemental supports and hence the effective lever arm available to produce the bending moment. This increase also decreases the load on the self-aligning bearings. It is also of course basically possible to employ supplemental hydraulic supports when the distance between the self-aligning bearings is somewhat less than the distance between the bearings on the mating roll (claim 17). The distance between the supported surfaces of the yoke can then be somewhat greater than distance between the bearings on the mating roll.

The hydraulic supports can be designed in various ways. The main support in the middle range can either be a number of hydrostatic pressure shoes or (as with the floating roll discussed in the introduction) a continuous semiannular compartment containing oil under low pressure and bordered by elastic longitudinal and peripheral sealing strips. The advantage of the latter form is that the yoke will not be weakened with holes for hydrostatic shoes, so that its diameter can be shorter, which also decreases the size and weight of the shell and makes it cheaper to manufacture. No matter what design is selected for the main support, the supplemental supports can also be either hydrostatic pressure shoes or semiannular pressurized chambers.

BRIEF DESCRIPTION OF THE DRAWINGS

Some embodiments of the invention will now be specified with reference to the drawings. Each of the four figures shows a partial section through one end of a press role and, schematically, the associated part of the mating roll.

DESCRIPTION OF THE PREFERRED EMBODIMENTS

Figure 1:
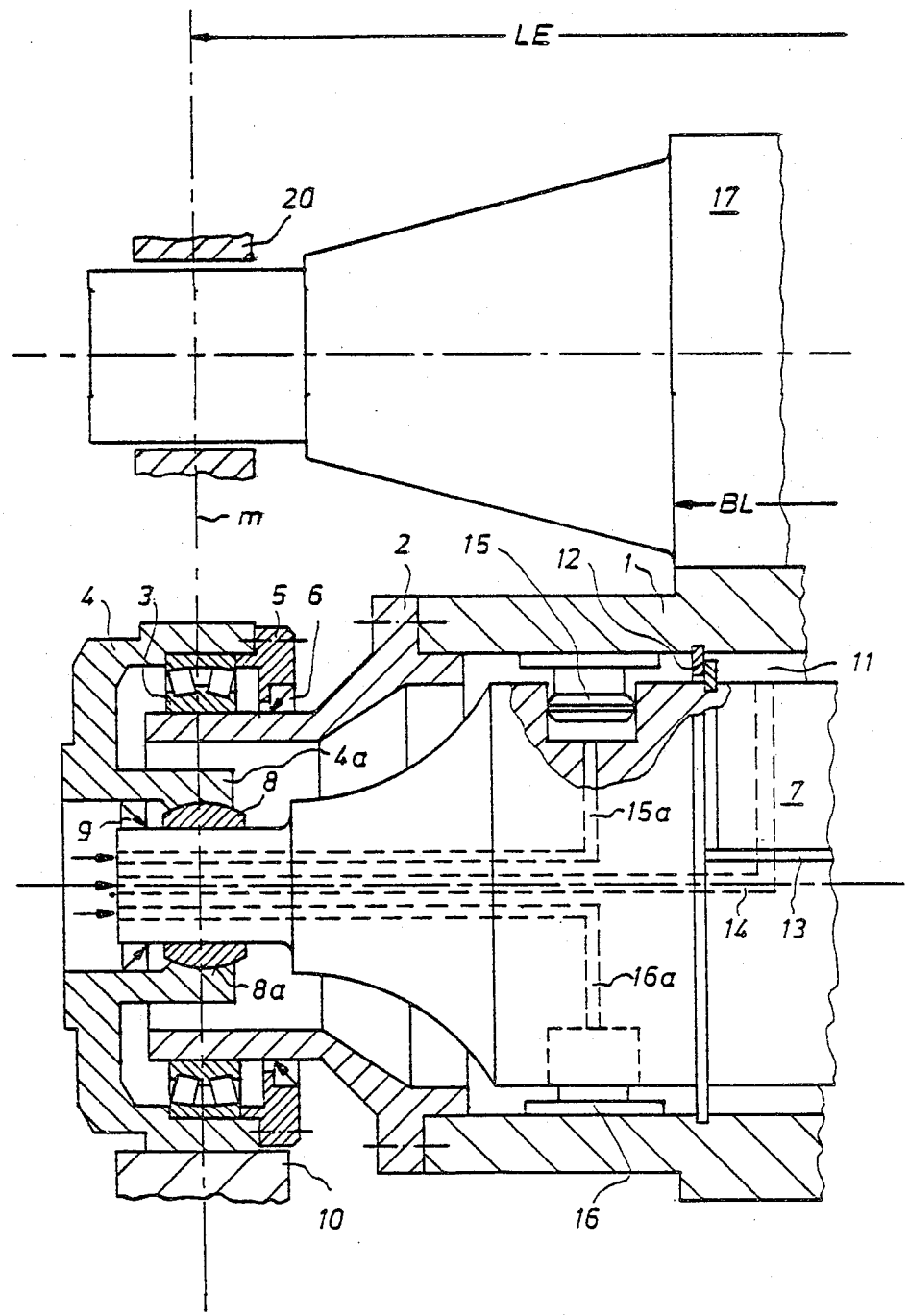
FIG. 1 shows an embodiment that has no drive and in which the self-aligning bearing of the roll shell is mounted outside it.
Figure 2:
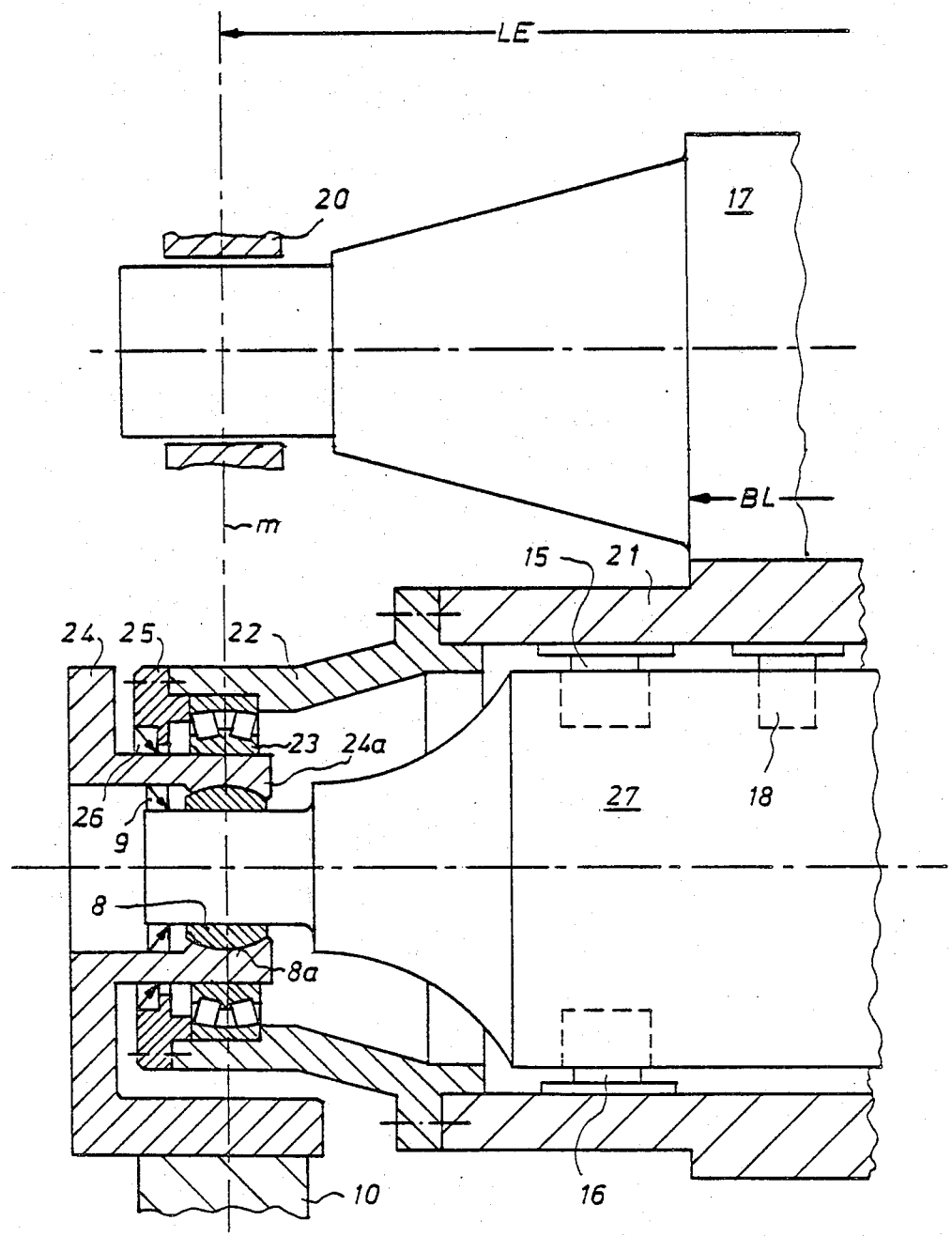
FIG. 2 shows another embodiment that has no drive and in which the self-aligning bearing of the roll shell is mounted inside it.
Figure 3:
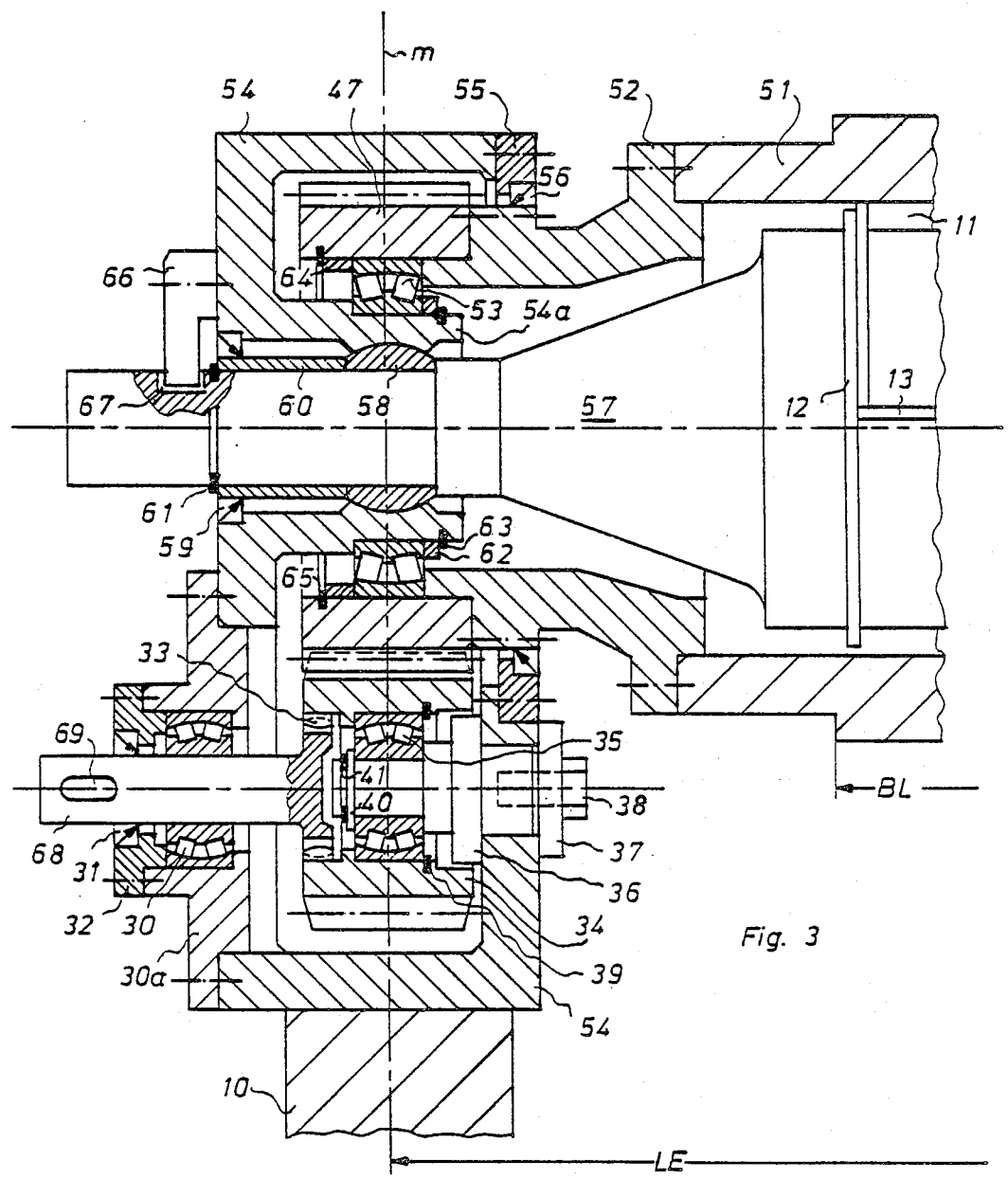
FIG. 3 shows a development of the embodiment in FIG. 2 that has a drive.

Each roll has a movable bearing on one end, as shown in FIGS. 1 and 2 and a fixed bearing on the other, as in FIG. 3. Yoke 57 and roll shell 51, 52, and 47 are fastened at the fixed-bearing end so as to permit no axial displacement in relation to frame 60, whereas axial displacement of yoke 7; 27 and roll shell 1, 2; 21, 22 with respect to frame 10 is possible at the movable-bearing end. Except for the means that prevent the axial displacement, the mountings at each end do not differ.

As FIG. 1 shows, the rotating roll shell 1 is prolonged by a flanged bearing bushing 2. Self-aligning bearing 3 connects bushing 2 to support cap 4, which also houses the bearing. Cap 4 is sealed with a cover 5 that has a sealing lip 6. Support cap 4 has a tubular collar 4a that extends into bearing bushing 2. Yoke 7 is articulated by means of a spherical liner 8 that has a contact surface 8a to collar 4a of cap 4, on which it rests. A sealing lip 9 seals the gap between yoke 7 and support cap 4. Cap 4 is fastened to a movable bearing lever or to a frame 10.

There is a semiannular pressurized compartment 11 between shell 1 and yoke 7. Compartment 11 is bordered by peripheral seals 12 and by longitudinal sealing strips 13 that lie opposite each other. It can be supplied with compressed oil over a channel 14 to apply a support force to shell 1 to counteract the force of the mating roll. Compartment 11 (the main support) is only slightly shorter than the length of the press area BL. There are supplemental supports in the form of hydrostatic pressure shoes 15 and 16 outside press area BL at each end of shell 1. Their axes lie in the press plane (which coincides with the plane of the drawing). They can be activated with compressed oil supplied from lines 15a and 16a. One shoe 15 works toward mating roll 17, the other in the opposite direction. An additional, calculated flexion can thus be imposed on the ends of roll shell 1 when necessary. A supplemental semiannular pressurized compartment similar to compartment 11 can be used instead of hydrostatic pressure shoes 15 and 16.

The center plane m of bearing 20 on the mating roll is perpendicular to the axis of rotation of the press roll. The distance from this center plane to that of the bearing on the other end of the roll is the bearing distance LE. The center planes of bearing 20 and of self-aligning bearing 3 on each end of the roll coincide. This is another way of saying that the bearing distances are equal. The "bearing distance" of support surfaces 8a on yoke 7 is also the same.

FIG. 2 also shows a bearing bushing 22 flanged to a rotating roll shell 21 and connected to a support cap 24 with a self-aligning roller bearing 23. In this case, however, bearing 23 is inside bushing 22, with its inner ring resting on collar 24a of cap 24. A cover 25 with a sealing lip 26 seals off the oil chamber of bearing 23. Yoke 27 is separated, as in FIG. 1, by an intermediate ring 8 from support cap 24. Yoke 27 is provided with hydrostatic pressure shoes 18, also called support pistons, which support shell 21 from inside. The press roll has a row of several such shoes 18 (the main support) along the press plane. Supplemental hydrostatic pressure shoes 15 and/or 16, which are again outside press area BL can be supplied with pressure in such a way as to force a desired flexion of roll shell 21.

FIG. 3 shows a powered embodiment with a semiannular pressure compartment 11 (as in FIG. 1) but without supplemental supports, although such could of course be added if necessary. A bearing bushing 52 screws into shell 51 and a crown gear 47 to bushing 52. The shell, which is thus extended in length, is again mounted with a self-aligning roller bearing 53 to the collar 54a of the support cap 54. The yoke 57 is again articulated to collar 54a by a spherical liner 58. A sealing lip 59 seals the gap between support cap 54 and a bushing 60 that has been slid onto yoke 57. A spring washer 61 holds spherical liner 58 in place axially over bushing 60 (a fixed bearing). Support cap 54 is attached to a contact-pressure lever, contact-pressure piston, or frame 10. Bearing 53 is prevented from moving axially with respect to support cap 54 by a support ring 62 and a spring washer 63. On the other hand, crown gear 47 is prevented from moving axially with respect to bearing 53 by support ring 64 and spring washer 65 (a fixed bearing).

A lug 66 that is fastened to support cap 54 projects into a groove 67 in yoke 57 and prevents it from turning. This device is not shown in FIGS. 1 and 2.

A drive shaft 68 with a feather 69 is powered through a cardan drive, not shown. Drive shaft 68 is mounted in a spherical bearing 30 and sealed with a sealing lip 31 in a cover 32. Bearing 30 and cover 32 rest in a bearing bracket 30a that screws onto support cap 54. Shaft 68 powers an angularly adjustable geared coupling 33 that activates a drive pinion 34 that mates with crown gear 47. There is a spherical bearing 35 in the center of drive pinion 34, on which it pivots on a supporting bolt 36 that is fastened rigidly with a molded bond 37 and a screw 38 to support cap 54. When the press roll is in operation and shell 51 bends, so that crown gear 47 has to tilt, pinion 34 will readily adjust to the slant.

Bearing 35 is axially stabilized on the one hand by a spring washer 39 in pinion 34 and on the other by a stabilizing ring 40 and spring washer 41 on bolt 36. Support cap 54 also forms a housing for cogwheels 34 and 47. This drive housing is sealed off near bearing busing 52 with a cover 55 and sealing lip 56.

A mating roll and its bearing are positioned as in FIG. 2, although not shown in FIG. 3.

Figure 4:
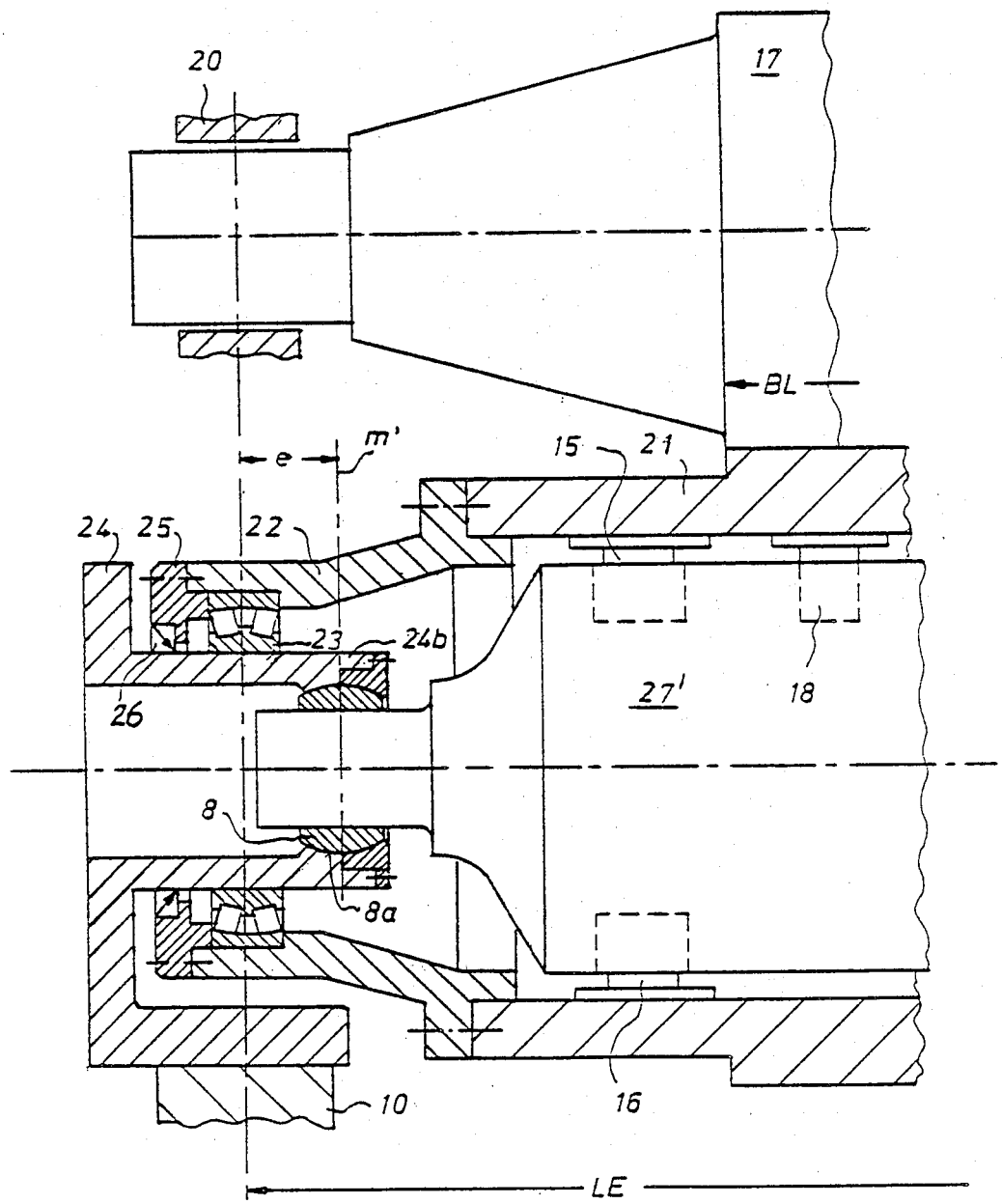
FIG. 4 shows another modification of the embodiment in FIG. 2.

The components in FIG. 4 that are the same as in FIG. 2 are labeled with the same index numbers. The only essential difference is that collar 24b is extended by distance e inside shell 21, 22 and that the yoke 27' can thus be shorter.

We claim:

1. A press roll with adjustable flexion for applying pressure in cooperation with a mating roll:
   the press roll comprising:
   a longitudinally extending yoke; a hollow shell around the yoke; the shell having first opposite ends;
   a self-aligning bearing at each first end of said shell for supporting the shell for rotating around the yoke and for holding the shell away from the yoke;
   the mating roll being adjacent the press roll; both the press roll and the mating roll having parallel rotation axes; both rolls together defining a press nip; the press nip and the roll axes being in a press plane; the mating roll having second opposite ends and being supported at the second opposite ends by respective mating roll bearings;
   the press roll yoke having third opposite ends; and support cap for each third end of the press roll yoke for supporting the yoke in position; at each third end, the yoke including a supported area which is supported by the respective support cap; each support cap including a collar extending into the interior of the hollow shell from the respective first end at which that support cap is positioned and the respective supported area of the yoke sitting on the respective collar;
   the longitudinal distance between the center planes of the supported areas of the yoke, which planes are perpendicular to the rotation axes of the rolls, is at most as great as the distance between the mating roll bearings;
   the distance between the self-aligning bearings of the roll shell is at least approximately the distance between the mating roll bearings.

2. The press roll of claim 1, wherein the mating roll bearings and the supported areas of the yoke are symmetrically located longitudinally with respect to each other along the roll axes.

3. The press roll of claim 1, wherein each supported area of the yoke comprises a curved support surface, and the support surface and the self-aligning bearing at each first end of the shell have at least approximately the same longitudinal midpoint along the roll axes.

4. The press roll of claim 1, wherein each supported area of the yoke has a center plane across the roll axes and the distance between the center planes of the two supported areas is shorter than the distance between the bearings of the mating roll.

5. The press roll of either of claims 1 or 3, wherein the collar of the support cap is tubular and the collar extends between the roll shell and the yoke.

6. The press roll of claim 5, wherein each self-aligning bearing is located inside the roll shell; each collar being hollow and having an outside and an inside; the self-aligning bearing being carried on the outside of the collar and the yoke being positioned on the inside of the collar.

7. The press roll of claim 6, further comprising a driven gear supported to the outside of the self-aligning bearing and being attached to the roll shell for the driven gear to be driven for driving the shell to rotate; a drive pinion in engagement with the driven gear for rotating the driven gear, and means for rotating the drive pinion.

8. The press roll of claim 7, wherein the drive pinion is mounted to driving means for enabling the drive pinion to pivot in position with respect to the driven gear, in addition to the drive pinion rotating.

9. The press roll of claim 8, wherein for the pivot mounting of the drive pinion, a spherical bearing is positioned inside the drive pinion; a supporting bolt being fastened on the support cap, and the spherical bearing resting on the supporting bolt.

10. The press roll of claim 9, wherein the drive pinion rotating means comprises a drive shaft and comprises a geared coupling connecting the drive shaft to the drive pinion.

11. The press roll of any of claims 1, 3 or 4, further comprising first hydraulic support means located between the yoke and the shell for controlling the pressure of the shell against the mating roll across the press nip; first means for supplying a pressure medium to the first hydraulic support;

supplemental hydraulic support means at each end of the shell and located between the yoke and the shell and also located longitudinally between the first hydraulic support means and the respective self-aligning bearing at the respective end of the shell, also for controlling the pressure of the shell against the mating roll across the press nip;

second means for supplying a pressure medium to the supplemental hydraulic support means independent of the first hydraulic support means.

12. The press roll of claim 11, wherein the second means for supplying pressure medium comprises means for selectively pressurizing each of the supplemental hydraulic support means at the opposite ends of the shell to an individual selected extent, independently of the pressurizing of the other supplemental hydraulic support means.

13. The press roll of claim 11, wherein each supplemental hydraulic support means is positioned to direct support force toward the mating roll.

14. The press roll of claim 11, wherein each supplemental hydraulic support means is positioned to direct support force away from the mating roll.

15. The press roll of claim 11, wherein the supplemental hydraulic support means at both ends of the shell are positioned for applying force in the press plane in respective opposing directions.

16. The press roll of claim 11, wherein each supplemental hydraulic support means comprises a semiannular pressure compartment between the yoke and the shell; seals around the compartment.

17. The press roll of claim 16, wherein each supplemental hydraulic support means is positioned to direct support force toward the mating roll.

18. The press roll of claim 16, wherein each supplemental hydraulic support means is positioned to direct support force away from the mating roll.

19. The press roll of claim 16, wherein the supplemental hydraulic support means at both ends of the shell are positioned for applying force in the press plane in respective opposing directions.

20. A press roll with adjustable flexion for applying pressure in cooperation with a mating roll:

the press roll comprising:

a longitudinally extending yoke; a hollow shell around the yoke; the shell having opposite ends;

a self-aligning bearing at each end of the shell for supporting the shell for rotating around the yoke and for holding the shell away from the yoke;

a support cap at each end of the press roll yoke for supporting the yoke in position; at each end said yoke including a supported area which is supported by the respective support cap;

first hydraulic support means located between the yoke and the shell for controlling the pressure of the shell against the mating roll across the press gap; first means for supplying a pressure medium to the first hydraulic support;

supplemental hydraulic support means at each end of the shell and located between the yoke and the shell and also located longitudinally between the first hydraulic support means and the respective self-aligning bearing at the respective end of the shell;

second means for supplying a pressure medium to the supplemental hydraulic support means independent of the first hydraulic support means.

* * * * *